E. LINDBERG.
DEMOUNTABLE RIM LOCK.
APPLICATION FILED JULY 14, 1916.
1,230,182.
Patented June 19, 1917.
2 SHEETS—SHEET 2.
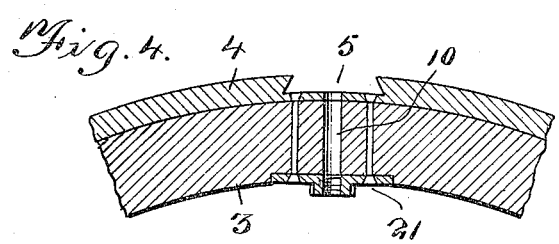
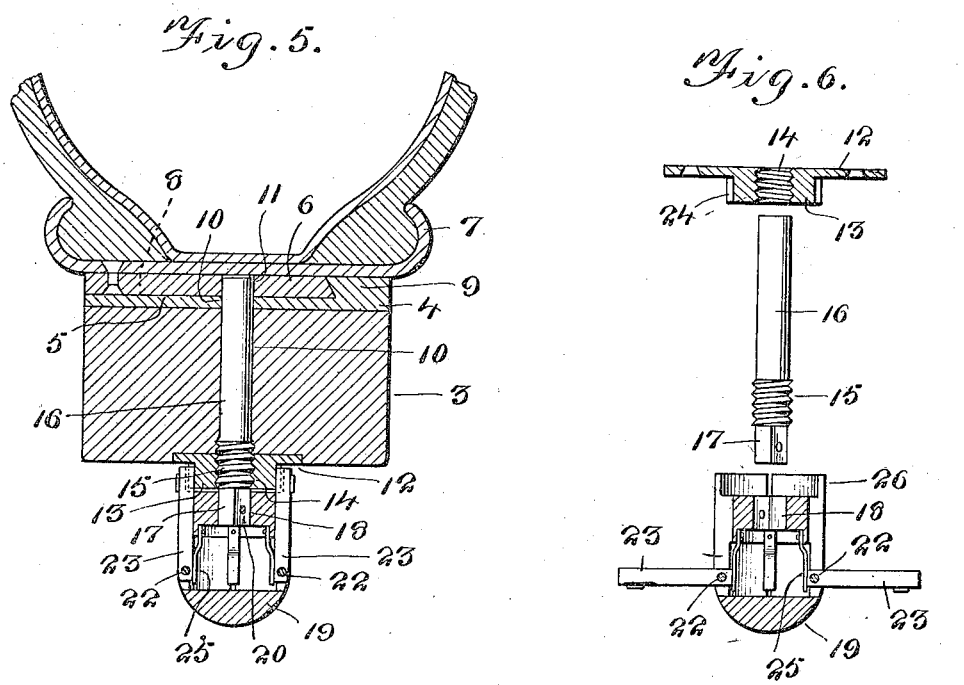
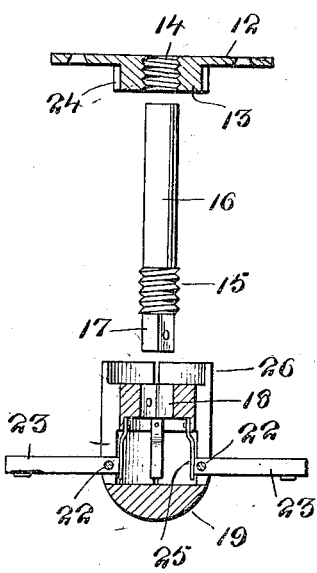
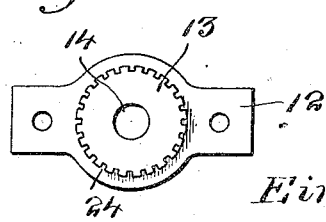
Inventor
Einar Lindberg
Witnesses
By Victor J. Evans
Attorney

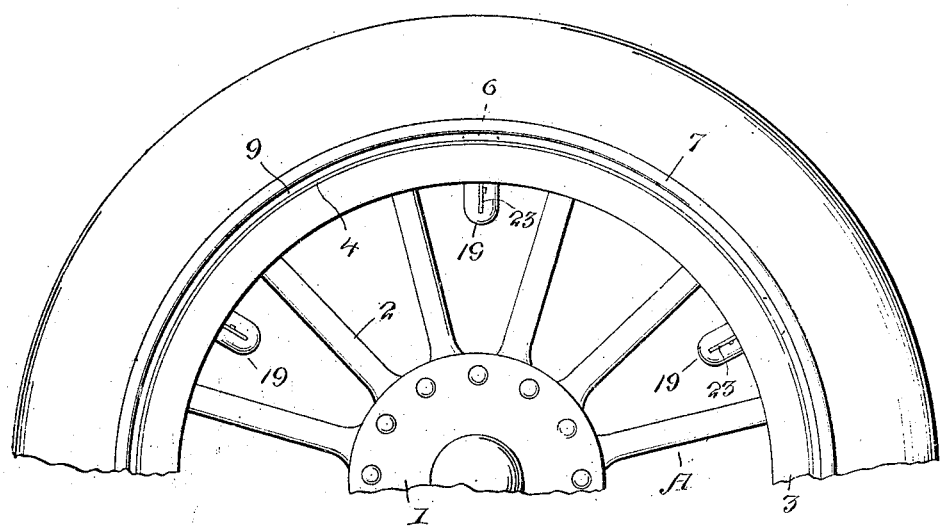
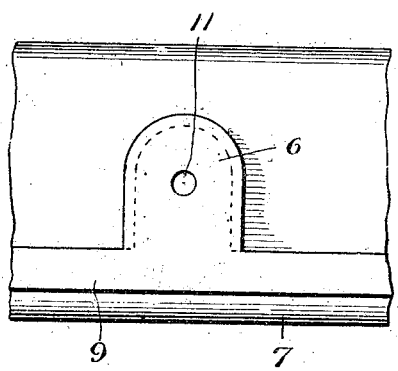
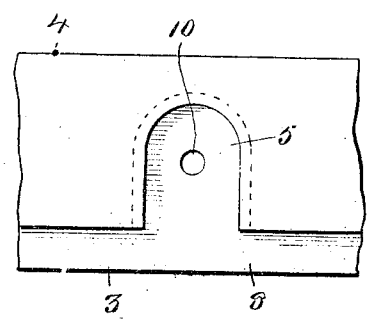

UNITED STATES PATENT OFFICE.

EINAR LINDBERG, OF RICE LAKE, WISCONSIN.

DEMOUNTABLE-RIM LOCK.

1,230,182.    Specification of Letters Patent.    Patented June 19, 1917.

Application filed July 14, 1916. Serial No. 109,348.

*To all whom it may concern:*

Be it known that I, EINAR LINDBERG, a citizen of the United States, residing at Rice Lake, in the county of Barron and State of Wisconsin, have invented new and useful Improvements in Demountable-Rim Locks, of which the following is a specification.

This invention relates to demountable rim locks, the object in view being to provide simple, reliable and secure means for locking a demountable rim on a vehicle wheel so that it cannot become detached and so that it may be easily removed without the use of tools, the rim locking device being equipped with its own operating means.

A further object in view is to provide a rim locking device which is proof against the entrance of foreign matter such as dust, dirt, grit and the like which would prevent the easy manipulation of said locking device.

With the above and other objects in view, the invention consists in the novel construction, combination and arrangement of parts, as herein described, illustrated and claimed.

In the accompanying drawings:—

Figure 1 is a fragmentary side elevation of a wheel, showing the present invention applied thereto.

Fig. 2 is a fragmentary plan view looking toward the inner face of the tire carrying rim.

Fig. 3 is a similar view of the outer face of the felly band.

Fig. 4 is a fragmentary longitudinal section through the felly and felly band, showing one of the fastening devices.

Fig. 5 is a cross section on an enlarged scale taken in line with one of the locking pins.

Fig. 6 is an enlarged detail view of one of the locking devices detached.

Fig. 7 is an inside face view of the same with the head removed and showing the locking pin in cross section.

Referring to the drawings A generally designates a vehicle wheel comprising the hub 1, spokes 2 and felly 3.

In the preferred embodiment of this invention, a metal band 4 is placed around the felly 3 and fixedly secured thereto by any usual or preferred means. This felly band is formed at intervals with transversely extending grooves 5 which are intended to receive corresponding tongues 6 on the tire carrying rim 7. The felly band 4 is also cut away to form an annular rabbet 8 while the tire carrying rim 7 is formed on its inner face with an annular rib 9 adapted to fit the rabbet 8. The felly 3 is formed with a series of holes 10 one of such holes being in alinement with each groove 5, while the tire carrying rim 7 is formed in each of the tongues 6 thereof with a socket 11 which registers with the hole 10 to receive the respective locking pin hereinafter particularly described.

Secured to the inner face of the felly 3 is a series of locking devices each comprising an attaching plate or boss 13 which extends toward the hub of the wheel, the plate 12 and the boss 13 being formed with a radial opening 14 which is internally threaded as shown to receive the threaded portion 15 of a locking pin 16 the end portion of which is smooth and adapted to pass through one of the openings 10 in the felly and the adjacent socket 11 in the tongue 6 of the rim 7. The inner end of the locking pin 16 is preferably squared as shown at 17 to fit into a correspondingly shaped socket 18 in a head 19 which is fastened to the pin 16 by means of a pin or key 20. The plate 12 is fastened to the inner face of the felly 3 by bolts 21 or the equivalent thereof.

The head 19 has pivotally attached thereto at 22, a plurality of arms 23 which are adapted to be disposed at right angles to the length of the pin 16 or folded into substantially parallel relation to said pin as shown in Fig. 5. The boss 13 is formed in its outer peripheral face with locking notches 24 adapted to receive the free ends of the arms 23 when folded to the position shown in Fig. 5. Springs 25 bear against the pivoted ends of the arms 23 and serve to hold said arms either in the position shown in Fig. 5 or the position shown in Fig. 6. These springs 25 are carried by Fig. 6 and secured to the head 19. The head 19 is formed with an annular flange or dirt guard 26 which encircles the notched boss 13 and serves to prevent foreign matter from coming in contact with the locking pin 16 and particularly the threaded portion 15 thereof.

From the foregoing description, taken in connection with the accompanying drawings it will now be understood that by unscrewing the locking pin 13 and moving the smooth end portions thereof out of engagement with the tongues 6, the rim carrying the tire may be removed from the wheel. After the desired repairs are made, the tire carrying rim is again mounted upon the wheel and the locking pins 16 are then screwed outwardly until they fit tightly in the sockets 11. Then the arms 23 by means of which the heads of the pins 16 have been turned are swung inwardly so that the free ends thereof engage the notches 24 of the boss 13 in which position the arms 23 lie within the lines of the head 19 so that they cannot be broken, bent or otherwise injured. The tongues 6 in connection with the grooves 5 take the major portion of the strain in a longitudinal direction from the locking pins 16 while the latter prevent any relative lateral movement between the demountable rim and the wheel. At the same time the demountable rim may be easily released and removed or replaced and again securely fastened in position on the wheel.

I claim:—

1. The combination with the wheel, of a band encircling the wheel felly fastened thereto and formed at one side with an annular rabbet, and transversely extending grooves intersecting said rabbet, a tire carrying rim formed with an annular groove to fit said rabbet and also formed with transversely extending tongues to fit the aforesaid grooves, the felly being formed with holes extending radially therethrough and intersecting said grooves, and the tire carrying rim being formed with sockets in said tongues in line with the holes in the felly, locking pins adapted to be inserted through said holes and into said sockets, base plates secured to the felly and having said pins threaded through the same, a head on each of said locking pins, and pivoted arms carried by said head and movable through an arc of substantially ninety degrees.

2. The combination with a wheel, and a demountable rim, of rim locking means carried by said wheel, each rim locking device comprising a plate fastened to the inner face of the wheel felly, a locking pin threaded through said plate and movable in the direction of its length to engage the demountable rim for the purpose of locking and releasing the same, a notched locking boss on said plate, a head fast on said locking pin, arms pivotally attached to said head, and means for yieldingly holding said arms substantially at right angles to the length of the locking pin and also for holding the free ends of said arms in engagement with the notched boss.

3. The combination with a wheel, and a demountable rim, of rim locking means carried by said wheel, each rim locking device comprising a plate fastened to the inner face of the wheel felly, a locking pin threaded through said plate and movable in the direction of its length to engage the demountable rim for the purpose of locking and releasing the same, a notched locking boss on said plate, a head fast on said locking pin, arms pivotally attached to said head, and means for yieldingly holding said arms substantially at right angles to the length of the locking pin and also for holding the free ends of said arms in engagement with the notched boss, said head being provided with an annular guard flange which encircles said boss.

In testimony whereof I affix my signature.

EINAR LINDBERG.